Jan. 29, 1924 — P. S. SCHUHMANN — 1,481,931
FILTER LEAF
Filed April 19, 1923
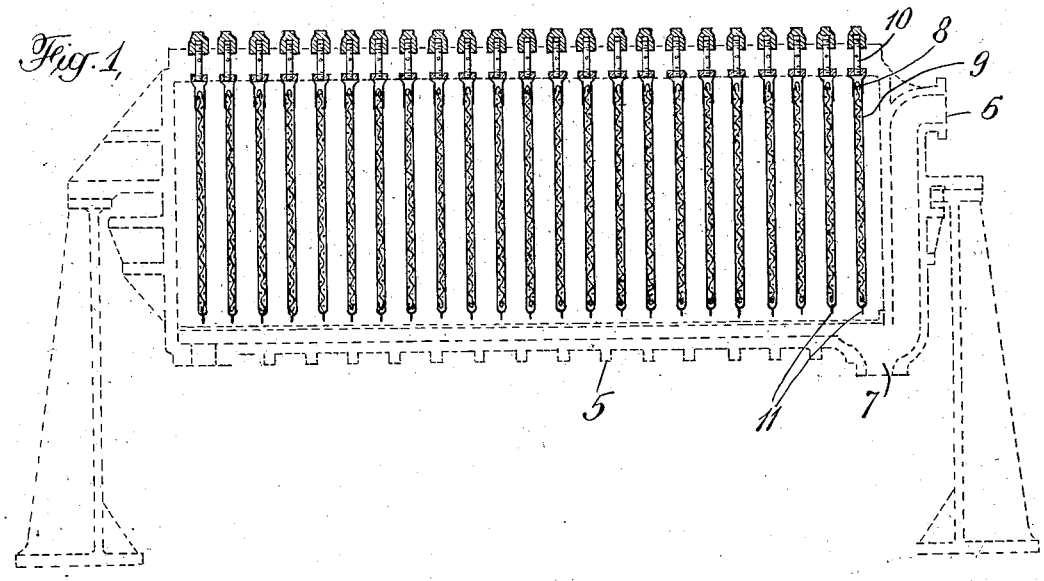
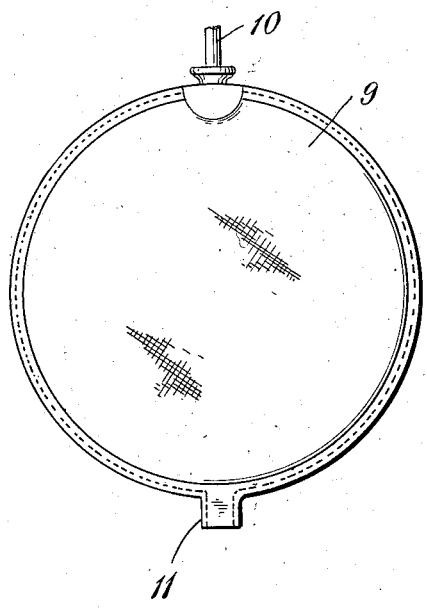
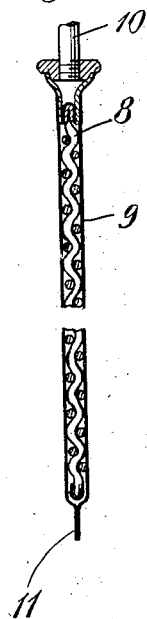
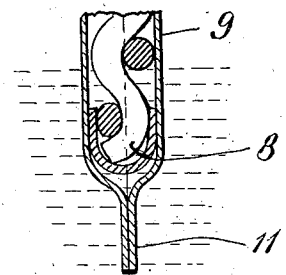
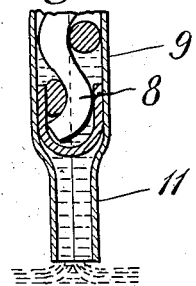
INVENTOR
Peter Sherb Schuhmann
BY Pennie Davis Marvin & Edmonds
his ATTORNEYS Patented Jan. 29, 1924.

1,481,931

UNITED STATES PATENT OFFICE.

PETER SHERB SCHUHMANN, OF WOODHAVEN, NEW YORK.

FILTER LEAF.

Application filed April 19, 1923. Serial No. 633,078.

*To all whom it may concern:*

Be it known that I, PETER SHERB SCHUHMANN, a citizen of the United States, residing at Woodhaven, in the county of Queens, State of New York, have invented certain new and useful Improvements in Filter Leaves; and I do hereby declare the following to be a full, clear, and exact description of the invention, such as will enable others skilled in the art to which it appertains to make and use the same.

This invention relates to filtering apparatus and particularly to filters of the leaf type in which liquid is carried through a filter medium at the surface of the leaf by pressure or suction.

Such filters usually comprise a plurality of leaves, each consisting of a suitable frame or support and a filter cloth stitched over the frame. The leaves are supported in a receptacle which may be closed or open and in which the liquid to be filtered is held. In operating filters of the type described, the pressure or suction is withdrawn when a cake of sufficient thickness has been built up. At that time the space within each leaf is filled with liquid and when the liquid is drained from the receptacle the liquid within the leaf seeps through the filter cloth, exerting, at the same time, a pressure which bulges the cloth. This causes the cake to slide and break and prevents uniform washing. To prevent bulging of the filter cloths, it has been necessary heretofore to insert fastenings, called grommets, through the cloth and frames. Moreover, the liquid being filtered mixes with the wash water in greater proportion than is desirable; thus introducing losses in efficiency which cannot be avoided with filter leaves as heretofore known.

It is the object of the present invention to increase the efficiency of filters by avoiding mixture of the liquid which has passed through the filter cloth with the wash water and by preventing the cloth from bulging.

Another object of the invention is to simplify the filter leaves by eliminating grommets and to provide self-draining filter leaves which permit the escape of liquid from the frames when pressure or suction is withdrawn.

Further objects and advantages of the invention will be apparent as it is better understood by reference to the following specification and accompanying drawing, in which Fig. 1 is a view of the assembled filter leaves;

Fig. 2 is a side elevation of a filter leaf embodying the invention;

Fig. 3 is a transverse section through the filter leaf; and

Figs. 4 and 5 are enlarged sectional details of the valve at the bottom of the filter leaf indicating the operation thereof.

In carrying out the invention filter leaves of any kind may be used, the frames and filter cloth being such as is best adapted to the handling of any given material. The leaves may be supported in open or closed receptacles and the liquid may be passed through the filter cloth by suction or pressure as is preferred. In a common type of filter to which the invention has been applied, the leaves are supported in a cylindrical closed tank, the bottom of which may swing downwardly to permit discharge of the cake. A pressure inlet permits the introduction of liquids with suspended solids into the tank and the filter leaves are connected to an outlet through which the filtered liquid escapes.

Each leaf comprises a frame or support and a cloth bag which completely encloses the frame. The frame is circular and the cloth is sewed in place thereon to provide two oppositely disposed faces through which the liquid passes. Instead of closing the bag as is usual, it is, according to the present invention, provided with a downwardly extending neck which is open at the bottom. The cloth forming the neck is sewed at the opposite edges thereof and the normal tendency of the cloth is to remain in contact. When pressure or suction is exerted to operate the filter, the opposite sides of the neck remain closely in contact and the passage between the two sides of the neck is closed tightly to prevent passage of liquid containing suspended solids therethrough. When the pressure or suction is released and the liquid is drained from the tank, the weight of liquid in the leaf causes the opposite sides of the neck to spread and thus permit the liquid to return freely to the tank. The neck consequently forms an automatic valve which prevents the passage of liquid into the leaf but permits escape of liquid therefrom.

Referring to the drawing, 5 indicates the tank or receptacle having a pressure inlet 6 for the liquid carrying suspended particles and a drain outlet 7. A plurality of leaves are supported in the tank 5, each of which may consist of a frame 8 and a covering 9 of filter cloth. Each leaf is provided with an outlet 10 through which the filtered liquid escapes, these outlets being connected to a header (not shown). This arrangement permits the introduction of liquid containing solids in suspension to the tank and the withdrawal of filtered liquid. In operation, when the cake has built up on the leaves to the required thickness, pressure is released and the tank is drained through the outlet 7.

At the bottom of each filter bag a neck 11 is formed by sewing together the edges of extensions of the filter cloths. As shown in Figs. 3 and 4 the end of the neck is open. While pressure remains on the liquid in the tank the neck is closed as shown in Fig. 3, but when pressure is released the weight of liquid in the leaf opens the neck as shown in Fig. 4 and the liquid drains readily from the leaf. When water is introduced to wash the cake, the neck closes, and when the wash water is discharged from the tank the leaf is again drained through the open neck.

The advantages of the invention are simplification of the filter leaf, no grommets being used, and increased efficiency because the cake does not slide and fall and the filtered liquid does not mix with the wash water. Washing is more rapid and certain, and loss of solids in the wash water is reduced to a minimum. The filter cloth is free throughout its area and it can flap back and forth without bulging. This keeps the pores of the cloth free from solids and increases its life.

Various changes may be made in the details of arrangement of the filter and in the means employed to prevent escape of liquid from the leaf without departing from the invention or sacrificing any of the advantages thereof.

I claim:—

1. In a filter, a leaf comprising a frame, a filter medium supported thereon and means automatically operating to prevent entrance of liquid to the leaf except through the filter medium and to permit the escape of liquid therefrom when the filter is drained.

2. In a filter, a leaf comprising a frame, a filter medium supported thereon, means automatically operating to prevent entrance of liquid to the leaf except through the filter medium and to permit the escape of liquid therefrom when the filter is drained, said means comprising a valve at the bottom of the leaf.

3. In a filter, a leaf comprising a frame, a filter medium supported thereon, means automatically operating to prevent entrance of liquid to the leaf except through the filter medium and to permit the escape of liquid therefrom when the filter is drained, said means comprising a valve at the bottom of the leaf consisting of extensions of the filter medium secured at the edges and open at the bottom.

4. In a filter, a leaf comprising a frame and a bag of filter cloth surrounding the frame and having an open neck at the bottom which is adapted to close when the filter is filled with liquid and to open when the filter is drained.

In testimony whereof I affix my signature.

PETER SHERB SCHUHMANN.